United States Patent
Deng

(10) Patent No.: US 12,481,187 B2
(45) Date of Patent: Nov. 25, 2025

(54) DRIVING BACKPLATES INCLUDING REFLECTIVE LAYER HAVING OVERLAPPING PART, MANUFACTURING METHODS THEREOF, AND DISPLAY DEVICES

(71) Applicant: TCL CHINA STAR OPTOELECTRONICS TECHNOLOGY CO., LTD., Guangdong (CN)

(72) Inventor: Hongzhao Deng, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/790,926

(22) Filed: Jul. 31, 2024

(65) Prior Publication Data

US 2024/0393640 A1     Nov. 28, 2024

Related U.S. Application Data

(63) Continuation of application No. 18/202,934, filed on May 28, 2023, now Pat. No. 12,072,575.

(30) Foreign Application Priority Data

Feb. 6, 2023 (CN) .......................... 202310112935.8

(51) Int. Cl.
G02F 1/13357      (2006.01)
G02F 1/1343       (2006.01)

(52) U.S. Cl.
CPC .. *G02F 1/133605* (2013.01); *G02F 1/133603* (2013.01); *G02F 1/134336* (2013.01)

(58) Field of Classification Search
CPC ......... G02F 1/133605; G02F 1/133603; G02F 1/134336
See application file for complete search history.

(56) References Cited

U.S. PATENT DOCUMENTS

| | | | |
|---|---|---|---|
| 2015/0177565 A1* | 6/2015 | Wang | G02F 1/133555 438/30 |
| 2021/0088846 A1* | 3/2021 | Ogawa | G02F 1/133605 |
| 2021/0098526 A1* | 4/2021 | Cho | H01L 25/0753 |
| 2021/0191174 A1* | 6/2021 | Li | G02F 1/133536 |
| 2021/0382225 A1* | 12/2021 | Kasai | G02F 1/133603 |
| 2022/0229219 A1* | 7/2022 | Itou | G02B 6/0055 |

(Continued)

*Primary Examiner* — Tracie Y Green
(74) *Attorney, Agent, or Firm* — PV IP PC; Christopher S. Ruprecht; Wei Te Chung

(57) ABSTRACT

The present disclosure discloses a driving backplate, a manufacturing method thereof, and a display device. The driving backplate includes a substrate, a reflective layer disposed on a side of a substrate, and a plurality of electronic devices disposed on a side of the reflective layer away from the substrate; the reflective layer includes a plurality of openings, and includes a plurality of overlapping parts disposed adjacent to the openings and corresponding to the plurality of openings; and an orthogonal projection of each of the overlapping parts on a plane of the substrate overlaps with an orthogonal projection of a part of each of the electronic devices on the plane of the substrate.

20 Claims, 3 Drawing Sheets

(56) References Cited

U.S. PATENT DOCUMENTS

| | | | |
|---|---|---|---|
| 2023/0098989 A1* | 3/2023 | Monomoshi | G02F 1/133603 362/97.1 |
| 2024/0162399 A1* | 5/2024 | Chen | H10H 20/856 |
| 2024/0178205 A1* | 5/2024 | Tang | H10H 20/857 |

* cited by examiner

DRIVING BACKPLATES INCLUDING REFLECTIVE LAYER HAVING OVERLAPPING PART, MANUFACTURING METHODS THEREOF, AND DISPLAY DEVICES

CROSS-REFERENCE TO RELATED APPLICATION

The present disclosure claims priority to and the benefit of Chinese Patent Application No. 202310112935.8, filed on Feb. 6, 2023, the disclosure of which is incorporated herein by reference in its entirety.

TECHNICAL FIELD

The present disclosure relates to display technology, and in particular, to driving backplates, manufacturing methods thereof, and display devices.

BACKGROUND

Compared to an organic light-emitting diode (OLED) device, a backlight source is generally required in a liquid crystal display (LCD) device to emit light due to differences of display principles. Types of backlight sources include side-lit backlight sources and direct type backlight sources. Light sources such as light-emitting diodes (LEDs) in an edge-lit backlight source are generally disposed at a side surface of a light guide plate, since the light guide plate evenly distribute light emitted by the light sources to every corner of the edge-lit backlight source, resulting in low luminous efficiency, high energy consumption, poor uniformity, and low brightness. However, because light sources such as LEDs are uniformly arranged in a direct type backlight source, uniformity of light and luminous efficiency can be improved. Especially, mini light-emitting diodes (Mini LEDs) as light source of the direct type backlight source, due to the Mini LEDs being about one-fortieth in size of traditional LEDs, make the layout of the light sources more precise and greatly improve image quality effect, attracting widespread attention in the industry.

Referring to FIG. 1, currently, in a driving backplate applied in a direct type backlight module of a LCD device, a reflective layer 12 is provided to cover a surface of a substrate 11, and electronic devices 14 are disposed on a side of the reflective layer 12 away from the substrate 12. Since a gap between an edge of each of the electronic devices 14 and the reflective layer 12 exposes the substrate 11, the reflectivity of the reflective layer 12 to light differs significantly from that of the exposed substrate 11 to light, resulting in problems of Mura (a phenomenon of presenting various traces caused by uneven display brightness) and light shadow on the driving backplate, which affects product quality.

Therefore, a driving backplate, a manufacturing method thereof, and a display device are required to solve the above-mentioned technical problems.

SUMMARY

In view of the above, an embodiment of the present disclosure provides a driving backplate, including:
a substrate;
a reflective layer disposed on a side of the substrate, and including a plurality of openings; and
a plurality of electronic devices disposed on a side of the reflective layer away from the substrate, and disposed to correspond to the plurality of openings one-to-one;
in which the reflective layer includes a plurality of overlapping parts disposed adjacent to the openings and corresponding to the plurality of openings, and an orthogonal projection of each of the overlapping parts on a plane of the substrate overlaps with an orthogonal projection of a part of each of the electronic devices on the plane of the substrate.

An embodiment of the present disclosure also provides a manufacturing method of a driving backplate, including:
providing a substrate;
forming a reflective layer on a side of the substrate, in which the reflective layer includes a plurality of openings; and
disposing a plurality of electronic devices on a side of the reflective layer away from the substrate, in which the plurality of electronic devices are disposed to correspond to the plurality of openings one-to-one;
in which the reflective layer includes a plurality of overlapping parts disposed adjacent to the openings and corresponding to the plurality of openings, and an orthogonal projection of each of the overlapping parts on a plane of the substrate overlaps with an orthogonal projection of a part of each of the electronic devices on the substrate.

An embodiment of the present disclosure also provides a display device including the above-mentioned driving backplate.

DETAILED DESCRIPTION

Figure 1:
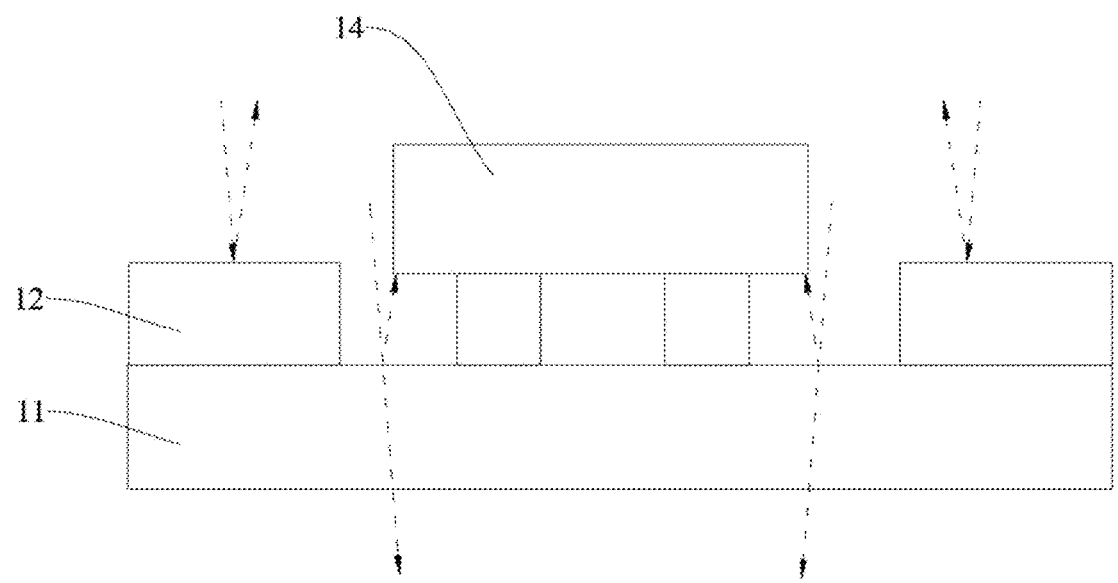
FIG. 1 is a schematic structural diagram of a driving backplate in the prior art.

The following provides a clear and complete description of the technical solution in the embodiments of the present disclosure, in conjunction with the accompanying drawings. It is apparant that the described embodiments are only some of the embodiments of the present disclosure, not all of them. Based on the embodiments of the present disclosure, other embodiments obtained by those skilled in the art without creative effort belong to a scope of the present disclosure. In addition, it should be understood that specific embodiments described herein are only used to explain and illustrate the present disclosure and are not used to limit the present disclosure. In the present disclosure, location terms used, such as "up" and "down", generally refer to up and down in actual using or working state of devices, in particular drawing directions in the drawings, unless otherwise described; terms "inside" and "outside" are specific to the contour of the devices.

Currently, product quality of a driving backplate applied in a direct type backlight module of an LCD device caused by Mura and light shadow, from which the quality of the LCD device is affected, due to exposure of gaps between edges of electronic devices and the openings of a reflective layer.

Figure 2:
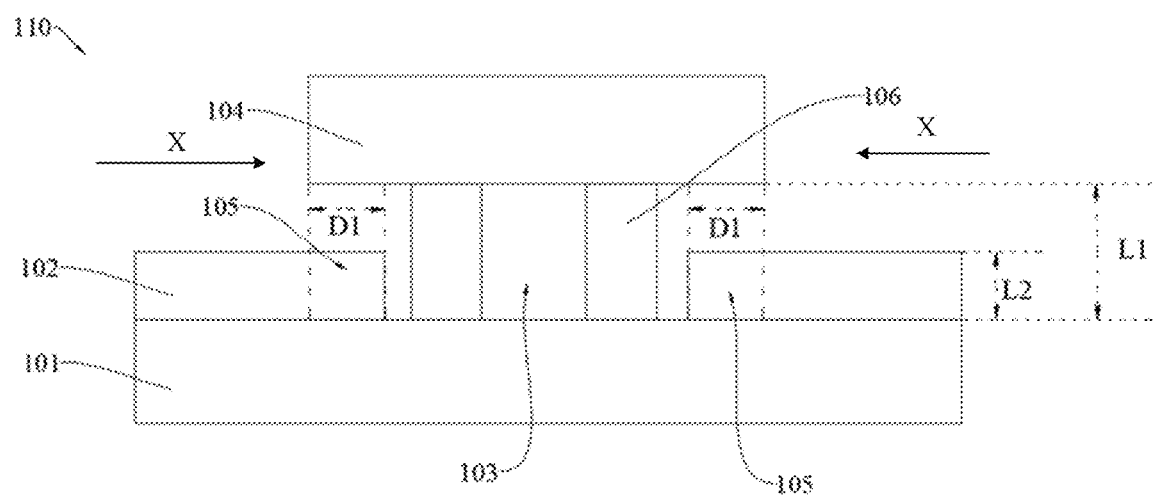
FIG. 2 is a schematic structural diagram of a driving backplate according to some embodiments of the present disclosure.

Referring to FIG. 2, an embodiment of the present disclosure provides a driving backplate 110 including a substrate 101, a reflective layer 102, and a plurality of electronic devices 104. The reflective layer 102 is disposed on a side of the substrate 101 and includes a plurality of openings 103. The plurality of electronic devices 104 are disposed on a side of the reflective layer 102 away from the substrate 101, and disposed to correspond to the plurality of openings 103 one-to-one. The reflective layer 102 includes a plurality of overlapping parts 105 disposed adjacent to the openings 103, and corresponding to the openings 103. An orthogonal projection of each of the overlapping parts 105 on a plane of the substrate 101 overlaps with an orthogonal projection of a part of each of the electronic devices 104 on the plane of the substrate 101.

The present disclosure reduces the exposed area of the gap between the reflective layer 102 and the electronic devices 104 by overlapping the orthogonal projection of each of the overlapping parts 105 of the reflective layer 102 on the plane of the substrate 101 with the orthogonal projection of the part of each of the electronic device 104 on the plane of the substrate 101, improves the optical taste of the driving back plate 110, and improves the product quality of the display device applying the driving back plate 110.

Technical solutions of the present disclosure are described in combination with specific embodiments.

Referring to FIG. 2, in the embodiment, the orthogonal projection of each of the overlapping parts 105 on the plane of the substrate 101 overlaps with the orthogonal projection of the part of each of the electronic devices 104 on the plane of the substrate 101, that is, parts of the reflective layer 102 covered by orthogonal projections of the electronic devices 104 on the reflective layer 102 are the overlapping parts 105.

Each of the overlapping parts 105 may partially surround each of the openings 103, or may completely surround each of the openings 103.

In some embodiments, the driving backplate 110 also includes a plurality of connection components 106 disposed in the openings 103 and corresponding to the openings 103. A first end of each of the connection components 106 close to the substrate 101 is connected to the substrate 101, and a second end of each of the connection components 106 close to the electronic devices 104 is connected to each of the electronic devices 104.

In some embodiments, each of the electronic devices 104 includes a first edge, and a shape of an orthographic projection of each of the electronic devices 104 on the plane of the substrate 101 may be circular, elliptical, square, rectangular, or other polygonal shapes. That is, a shape of an orthographic projection of the first edge on the plane of the substrate 101 may be circular, elliptical, square, rectangular, or other polygonal shapes. When the shape of the orthographic projection of each of the electronic devices 104 on the plane of the substrate 101 is rectangular, each of the electronic devices 104 may be cuboid, and a length, a width, and a height of each of the electronic devices 104 may be 900 μm, 600 μm, and 141 μm, respectively.

Each of the overlapping parts 105 includes a second edge away from each of the openings 103. When each of the overlapping parts 105 partially surrounds each of the openings 103, the second edge partially overlaps with the first edge. When each of the overlapping parts 105 completely surrounds each of the openings 103, the second edge completely overlaps with the first edge, and a shape of an orthographic projection of the second edge on the substrate 101 may be circular, elliptical, square, rectangular, or other polygonal shapes.

In some embodiments, when each of the overlapping parts 105 surrounds each of the openings 103, a minimum width D1 of the orthogonal projection of each of the overlapping parts 105 on the plane of the substrate 101 is greater than 0 μm, which is conducive to improve optical taste such as Mura and light shadow of the driving backplate 110 when light shines on an exposed part of the substrate 101. In some embodiments, the minimum width D1 of the orthogonal projection of each of the overlapping parts 105 on the plane of the substrate 101 is less than or equal to 100 μm, for example, 20 μm, 30 μm, 40 μm, 50 μm, 60 μm, 70 μm, 80 μm, 90 μm, etc. In some embodiments, a maximum width of the orthogonal projection of each of the overlapping parts 105 on the plane of the substrate 101 is less than or equal to 100 μm, for example, 20 μm, 30 μm, 40 μm, 50 μm, 60 μm, 70 μm, 80 μm, 90 μm, etc. In some embodiments, both of the minimum width of the orthogonal projection of each of the overlapping parts 105 on the plane of the substrate 101 and the maximum width of the orthogonal projection of each of the overlapping parts 105 on the plane of the substrate 101 are less than or equal to 100 μm. By designing the minimum width of the orthographic projection of each of the overlapping parts 105 on the plane of the substrate 101 being less than or equal to 100 μm and preventing the contact between the reflective layer 102 and the connection components 106, which may affect the functions of the electronic devices 104, the present disclosure ensures the electronic devices 104 function normally, avoids exposing gaps between the reflective layer 102 and the electronic devices 104 to light, improves optical taste of the driving backplate 110, and further improves product quality of display devices applying the driving backplate 110. When each of the overlapping parts 105 surrounds each of the openings 103, an actual value of the maximum width of the orthogonal projection of each of the overlapping parts 105 on the plane of the substrate 101 can be adjusted within a range greater than 0 μm and less than or equal to 100 μm, based on incident angles of light incident on the driving backplate 110, so as to avoid optical taste such as Mura and light shadow of the driving backplate 110 when light shines on the exposed part of the substrate 101. Specifically, an actual value of the maximum width of the orthogonal projection of each of the overlapping parts 105 on the plane of the substrate 101 at a larger incident angle of light incident on the driving backplate 110 can be greater than an actual value of the maximum width of the orthogonal projection of each of the overlapping parts 105 on the plane of the substrate 101 at a smaller incident angle of light incident on the driving backplate 110.

Specifically, each of the overlapping parts 105 includes a third edge adjacent to each of the openings 103, and surrounds each of the openings 103. A shape of an orthogonal projection of the third edge on the substrate 101 may be circular, elliptical, square, rectangular, or other polygonal shapes. The minimum width D1 of the orthogonal projection of each of the overlapping parts 105 on the plane of the substrate 101 is a minimum distance between an orthogonal projection of the second edge of each of the overlapping parts 105 on the substrate 101 and an orthogonal projection of the third edge of each of the overlapping parts 105 on the substrate 101. The maximum width of the orthographic projection of each of the overlapping parts 105 on the plane of the substrate 101 is a maximum distance between an orthographic projection of the second edge of each of the overlapping parts 105 on the substrate 101 and an orthographic projection of the third edge of each of the overlapping parts 105 on the substrate 101.

In some embodiments, each of the overlapping parts 105 includes a first side surface close to each of the openings 103, and a distance between the first side surface and each of the connection components 106 is greater than 0 μm, that is, a minimum distance between an orthogonal projection of the first side surface on the plane of the substrate 101 and an orthogonal projection of a side surface of each of the connection components 106 close to the first side surface on the plane of the substrate 101 is greater than 0 μm.

Each of the connection components 106 includes a first connection member and a second connection member. Each of the electronic devices 104 includes a first solder pad and a second solder pad. A second end of the first connection member close to each of the electronic devices 104 is connected to the first solder pad, and a first end of the first connection member close to the substrate 101 is connected to the substrate 101. A second end of the second connection member close to each of the electronic devices 104 is connected to the second solder pad, and a first end of the second connection member close to the substrate 101 is connected to the substrate 101. A shape of an orthographic projection of the first connection member on the plane of the substrate 101 and/or a shape of an orthographic projection of the second connection member on the plane of the substrate 101 may be circular, square, rectangular, hexagonal, or other polygonal shapes. A number of first connection members and a number of second connection members in each of the connection components 106 can be 2, 4, 8, 10, 12, . . . , i.e., 2N (N is a positive integer).

The first connection member includes a fourth edge close to the first side surface, the second connection member includes a fifth edge close to the first side surface, and the third edge of each of the overlapping parts 105 is provided at a side of each of the connection components 106 close to the first side surface. A minimum distance between an orthographic projection of the first side surface on the plane of the substrate 101 and an orthographic projection of the side surface of each of the connection components 106 close to the first side surface on the plane of the substrate 101 is greater than 0 μm. That is, a minimum distance between an orthographic projection of the third edge on the substrate 101 and an orthographic projection of the fourth edge on the substrate 101 is greater than 0 μm, and a minimum distance between the orthographic projection of the third edge on the substrate 101 and an orthographic projection of the fifth edge on the substrate 101 is greater than 0 μm.

By designing the minimum distance between the orthographic projection of the first side surface on the plane of the substrate 101 and the orthographic projection of the side surface of each of the connection components 106 close to the first side surface on the plane of the substrate 101 being greater than 0 μm, the present disclosure avoids the contact between the reflective layer 102 and the connection components 106, prevents the contact between the reflective layer 102 and the connection components 106 from affecting functions of the electronic devices 104, while ensuring normal functions of the electronic devices 104. The present disclosure is also beneficial to avoid the exposure of the gaps between the reflective layer 102 and the electronic devices 104, so as to improve optical taste of the driving backplate 110, improving product quality of display devices applying the driving backplate 110.

In some embodiments, a thickness of the connection components 106 is a maximum distance between an end of the connection components 106 close to the substrate 101 and an end of the connection components 106 close to the electronic devices 104. A thickness of the overlapping parts 105 is a maximum distance between a side of the overlapping parts 105 close to the electronic devices 104 and a side of the overlapping parts 105 close to the substrate 101. The thickness L1 of the connection components 106 is greater than or equal to the thickness L2 of the overlapping parts 105. In some embodiments, a distance between a side of the electronic devices 104 close to the overlapping parts 105 and a side of the overlapping parts 105 close to the electronic devices 104 is greater than or equal to 0 μm. By designing the thickness L1 of the connection components 106 being greater than or equal to the thickness L2 of the overlapping parts 105, the present disclosure can prevent the contact between the reflective layer 102 and the connection components 106 from affecting normal functions of the electronic devices 104. While ensuring normal functions of the electronic devices 104, the design of the present disclosure is also beneficial to avoid the exposure of the gaps between the reflective layer 102 and the electronic devices 104, so as to improve optical taste of the driving backplate 110, improving product quality of display devices applying the driving backplate 110.

Figure 5:
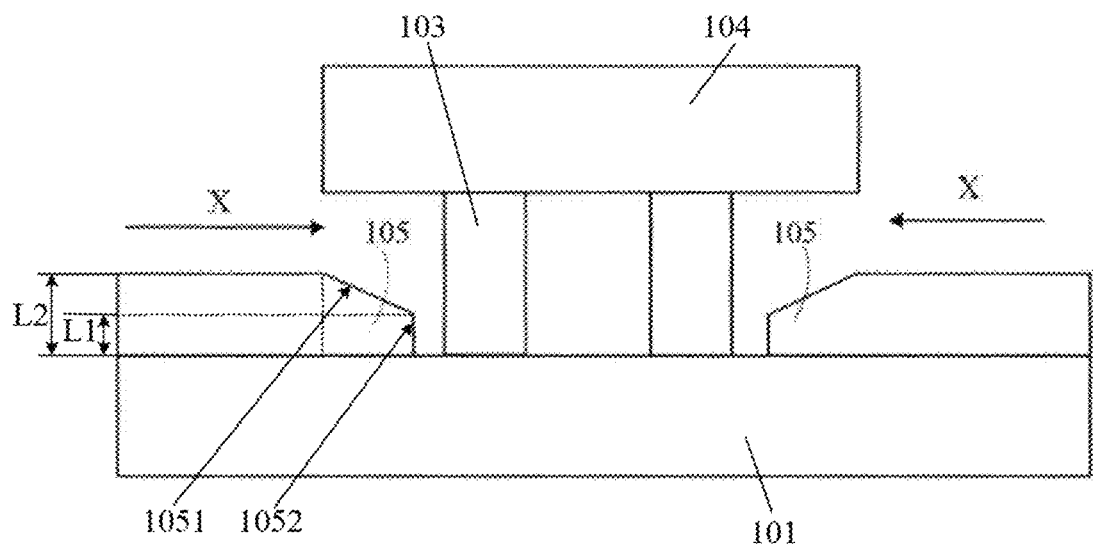
FIG. 5 is a schematic structural diagram of a driving backplate according to some embodiments of the present disclosure.

In some embodiments, the thickness of the overlapping parts 105 remains unchanged along a direction X close to the openings 103, as illustrated in FIG. 2, or the thickness of the overlapping parts 105 gradually decreases along the direction X close to the openings 103, as illustrated in FIG. 5. Specifically, one of the overlapping parts 105 includes an included surface 1051, and in a direction perpendicular to the substrate 101, a distance L1 between the inclined surface 1051 at one end of the overlapping parts 105 close to a corresponding one of the openings 103 and the substrate 101 is less than a distance L2 between the inclined surface 1051 at another end of the one of the overlapping parts 105 away from the corresponding one of the openings 103 and the substrate 101. In some embodiments, one of the overlapping parts 105 further includes an inner surface 1052 directly connected to the inclined surface 1051, the inner surface 1052 is a surface of the one of the overlapping parts 105 closest to the corresponding one of the openings 103, and the inner surface 1052 is perpendicular to the substrate 101.

In some embodiments, a thickness of the reflective layer 102 is less than or equal to 60 μm. For example, the thickness of the reflective layer 102 may be 25 μm, 40 μm, 50 μm, and so on. Preferably, the thickness of the reflective layer 102 is greater than or equal to 10 μm and less than or equal to 35 μm. For example, the thickness of the reflective layer 102 may be 15 μm, 20 μm, 25 μm, 30 μm, and so on. Specifically, the thickness L2 of the overlapping parts 105 is greater than or equal to 10 μm and less than or equal to 35 μm. For example, the thickness L2 of the overlapping parts 105 may be 15 μm, 20 μm, 25 μm, 30 μm, and so on. The reflective layer 102 also includes non-overlapping parts. A thickness of the non-overlapping parts is greater than or equal to 10 μm and less than or equal to 35 μm. For example, the thickness of the non-overlapping part may be 15 μm, 20 μm, 25 μm, 30 μm, and so on.

In some embodiments, materials of the reflective layer 102 may be white ink, black ink, green ink, and so on. In some embodiments, the materials of the reflective layer 102 are white ink, which is conducive to improve a reflectivity of the reflective layer 102 to light emitted by light-emitting devices in the electronic devices 104, improving light utilization efficiency of backlight modules and/or display devices applying the driving backplate 110.

When the materials of the reflective layer 102 are white ink, the materials of the reflective layer 102 may include titanium dioxide, and a mass percentage of titanium dioxide in the materials of the reflective layer 102 is greater than or equal to 35% and less than or equal to 45%. For example, the mass percentage of titanium dioxide in the materials of the reflective layer 102 may be 38%, 40% 42%, etc. By applying titanium dioxide to the reflective layer 102 and designing the mass percentage of titanium dioxide being greater than or equal to 35% and less than or equal to 45%, it is conducive for the present disclosure to reduce the thickness of the reflective layer 102 to be less than or equal to the thickness of the connection components 106. For example, by designing the thickness of the reflective layer 102 being greater than or equal to 10 μm and less than or equal to 35 μm, the present disclosure can prevent the contact between the reflective layer 102 and the connection components 106 from affecting normal functions of the electronic devices 104. While ensuring normal functions of the electronic devices 104, it is also conducive for the present disclosure to avoid the exposure of the gaps between the reflective layer 102 and the electronic devices 104, so as to improve optical taste of the driving backplate 110, improving product quality of display devices applying the driving backplate 110.

In some embodiments, the titanium dioxide is a nano-material with an average particle size greater than or equal to 50 nm and less than or equal to 200 nm. The use of the nano-material is conducive to further improve the reflectivity of the reflective layer 102 to light emitted by the light-emitting devices in the electronic devices 104, improving light utilization of backlight modules and/or display devices applying the driving backplate 110. A shape of the titanium dioxide may be of nano-spheres, rod-shaped, etc.

In some embodiments, when the material of the reflective layer 102 is white ink, other than titanium dioxide, the material of the white ink also includes acrylate polymer and mono-ether-based solvent. A mass percentage of the acrylate polymer in the white ink is greater than or equal to 20% and less than or equal to 30%, and a mass percentage of the mono-ether-based solvent in the white ink is greater than or equal to 20% and less than or equal to 30%.

In some embodiments, the thickness L1 of the connection components 106 is greater than or equal to 35 μm and less than or equal to 50 μm. For example, the thickness L1 of the connection components 106 may be 40 μm, 45 μm, etc., which is conducive to prevent the contact between the reflective layer 102 and the connection components 106 from affecting functions of the electronic devices 104, and avoiding exposure of the gaps between the reflective layer 102 and the electronic devices 104, so as to improve optical taste of the driving backplate 110, and further improve product quality of display devices applying the driving backplate 110.

In the above-mentioned embodiment, a driving method of the driving backplate 110 may be active matrix (AM) driving, passive matrix (PM) driving, or a micro integrated circuit chip driving.

The substrate 101 may be a glass substrate, a printed circuit board (PCB) substrate, a bismaleimide triazine (BT) substrate, etc. When the substrate 101 is the glass substrate, a thickness of the glass substrate may be 0.4 mm, 0.5 mm, 0.7 mm, etc.

The substrate 101 includes a wire layer disposed on a side close to the reflective layer 102 and including a plurality of wires. A material of the wires includes but is not limited to copper. A preparation method of the wires includes but is not limited to a physical vapor deposition method, an electroplating method, a chemical plating method, etc.

The electronic devices 104 include first electronic devices that are light-emitting devices, such as Micro LEDs, Mini LEDs, etc. A gap between adjacent two first electronic devices may be 2 mm, 4 mm, etc. The electronic devices 104 also include second electronic devices that are driving devices, including but not limited to driving chips, resistors, capacitors, antifluctuators, etc. When the driving chips are micro integrated circuits (Micro ICs), a shape of an orthographic projection of each of the driving chips on the substrate 101 may be a square with a length of 1 mm and a width of 1 mm, or a rectangle with a length of 2 mm and a width of 1 mm. The first electronic devices are disposed on a light-emitting surface of the driving backplate 110, and the plane of the substrate 101 is parallel to the light-emitting surface of the driving backplate 110.

When the first electronic devices are Mini LEDs, the second electronic devices can perform a local dimming control on the first electronic devices. That is, the driving backplate 110 includes a plurality of backlight sub-areas, and each of the backlight sub-areas includes at least one of the first electronic devices. When the driving backplate 110 is driven by Micro ICs, the driving backplate 110 may include at least one Micro IC, and a number of the backlight sub-areas each of the Micro ICs can control may be 1, 4, 6, or 12. The second electronic devices can be disposed between the first electronic devices in the backlight sub-areas, but is not limited to the position.

When the driving backplate 110 is driven by Micro ICs, a number of channels of the Micro ICs may be but is not limited to, 4, 12, etc. Communication methods of the Micro ICs can be serial communication and/or parallel communication, etc.

In the driving backplate 110 according to the embodiment of the present disclosure, by designing the orthogonal projection of each of the overlapping parts 105 of the reflective layer 102 on the plane of the substrate 101 overlapping with the orthogonal projection of the part of each of the electronic devices 104 on the plane of the substrate 101, the exposed area of the gaps between the reflective layer 102 and the electronic devices 104 can be reduced, which can improve optical taste of the driving backplate 110, improving product quality of display devices applying the driving backplate 110.

Figure 3:
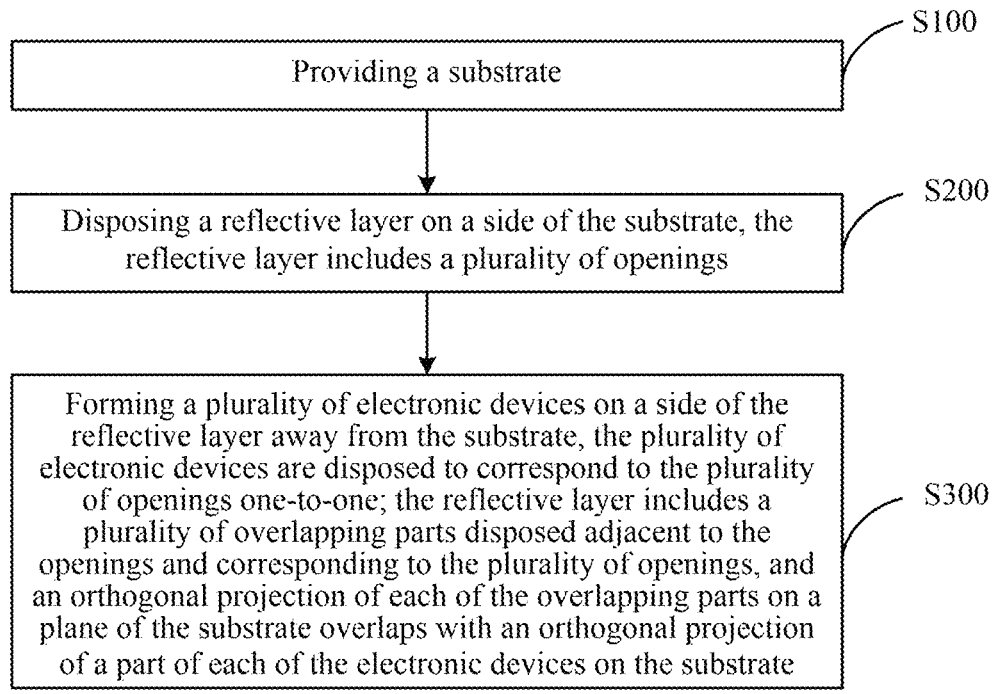
FIG. 3 is a flowchart of a manufacturing method of a driving backplate according to some embodiments of the present disclosure.

Referring to FIG. 2 and FIG. 3, an embodiment of the present disclosure also provides a manufacturing method of the driving backplate 110, including following steps: step S100, providing the substrate 101; step S200, forming the reflective layer 102 on a side of the substrate 101, the reflective layer 102 includes the plurality of openings 103, and includes the plurality of overlapping parts 105 disposed adjacent to the openings 103 and corresponding to the openings 103; and step S300, disposing the electronic devices 104 on a side of the reflective layer 102 away from the substrate 101, and the orthogonal projection of the part of each of the overlapping parts 105 on the plane of the substrate 101 overlaps with the orthogonal projection of the part of each of the electronic devices 104 on the plane of the substrate 101.

In some embodiments, the process of forming the reflective layer 102 on the side of the substrate 101 in step S200 includes but is not limited to spraying, printing, pressing, in situ growth, etc.

In some embodiments, the electronic devices 104 in step S300 may be connected to the substrate 101 through a bonding method, a welding method, a bonding method, etc.

In some embodiments, step S300 includes step S310 at which a connection layer is formed in the openings 103.

In some embodiments, a material of the connection layer may be solder paste.

When a material of the connection components 106 is solder paste, step S310 may include following steps: step S311, providing a steel mesh, and aligning and attaching the steel mesh with the substrate 101; step S312, printing the solder paste through the steel mesh into the openings 103 to form the connection layer; step S313, disposing the electronic devices 104 on a side of the connection layer away from the reflective layer 102; and step S314, forming the connection components 106 by the connection layer using a first preset process.

At step S311, the steel mesh includes a plurality of holes. When the steel mesh is aligned with and attached to the substrate 101, the holes are disposed to correspond to the openings 103 one-to-one.

In some embodiments, a thickness of the steel mesh ranges from 10 μm to 60 μm, and a pattern of an orthographic projection of each of the holes of the steel mesh on the plane of the substrate 101 may be square or rectangular, with a length ranging from 20 μm to 1000 μm and a width ranging from 20 μm to 1000 μm. For example, both the length and the width of the pattern of the orthographic projection of each of the holes are 20 μm, 100 μm, 500 μm, 1000 μm, etc. By designing the thickness of the steel mesh ranging from 10 μm to 60 μm, the length of each of the holes of the steel mesh ranging from 20 μm to 1000 μm, and the width of each of the holes of the steel mesh ranging from 20 μm to 1000 μm, so that a thickness of the connection components 106 finally formed can be within a range greater than or equal to 35 μm and less than or equal to 50 μm, which can prevent the contact between the reflective layer 102 and the connection components 106 from affecting functions of the electronic devices 104, and avoid the exposure of the gaps between the reflective layer 102 and the electronic devices 104, so as to improve optical taste of the driving backplate 110, improving product quality of display devices applying the driving backplate 110.

At step S312, in some embodiments, the solder paste is printed into the openings 103 through the steel mesh to form the connection layer by using a scraper. The scraper may be a resin scraper, and a material of the scraper may be phenolic resin, polyethylene, etc. Use of the glue scraper is conducive to increase the thickness of the connection layer, so that the thickness of the connection components 106 finally formed can be within the range greater than or equal to 35 μm and less than or equal to 50 μm.

At step S313, the first end of each of the connection components 106 close to the substrate 101 is connected to the substrate 101, the second end of each of the connection components 106 close to the electronic devices 104 is connected to each of the electronic devices 104. The orthographic projection of each of the overlapping parts 105 on the plane of the substrate 101 is located within the orthographic projection of the part of each of the electronic devices 104 on the plane of the substrate 101, and the thickness of the connection components 106 is greater than or equal to the thickness of the overlapping parts 105.

In some embodiments, the first preset process at step S314 may be a reflow soldering process.

Figure 4:
FIG. 4 is a schematic structural diagram of a display device according to some embodiments of the present disclosure.

Referring to FIG. 4, an embodiment of the present disclosure also provides a display device 10 including the above-mentioned driving backplate 110.

In some embodiments, the display device 10 includes a backlight module 100, which includes the above-mentioned driving backplate 110 and an optical diaphragm 120 disposed on the light-emitting side of the driving backplate 110.

In some embodiments, the optical diaphragm 120 includes a diffusion plate configured to convert light emitted by the first electronic devices of the driving backplate 110 into a surface light source. In some embodiments, the optical diaphragm 120 also includes a prism sheet disposed on a side of the diffusion plate away from the driving backplate 110 and configured to converge light incident on the prism sheet to improve front brightness. In some embodiments, the optical diaphragm 120 also includes a brightening film disposed on a side of the prism sheet away from the driving backplate 110 and configured to improve an utilization rate of the backlight module 100 to light emitted by the driving backplate 110. In some embodiments, the optical diaphragm 120 also includes a diffusion plate disposed between the diffusion plate and the prism sheet and configured to further soften and disperse light incident on the diffusion plate, to make light emitted from the diffusion plate more uniform.

In some embodiments, the display device 10 also includes a display panel 200 disposed on the light-emitting side of the backlight module 100. The display panel 200 may be a liquid crystal display panel which includes an array sub-substrate and a color film sub-substrate disposed opposite to each other. The display panel 200 also includes a liquid crystal layer disposed between the array sub-substrate and the color film sub-substrate, a first polarizer disposed on a side of the display panel 200 close to the backlight module 100, and a second polarizer disposed on a side of the display panel 200 away from the backlight module 100.

In the display device 10 according to the embodiment of the present disclosure, by designing the orthogonal projection of each of the overlapping parts 105 of the reflective layer 102 on the plane of the substrate 101 overlapping with the orthogonal projection of the part of each of the electronic devices 104 on the plane of the substrate 101, the exposed area of gaps between the reflective layer 102 and the electronic devices 104 can be reduced, which can improve optical taste of the driving backplate 110, improving product quality of display devices applying the driving backplate 110.

Embodiments of the present disclosure disclose the driving backplate, the manufacturing method thereof, and the display device. The driving backplate includes the substrate, the reflective layer disposed on a side of the substrate, and the electronic devices disposed on the side of the reflective layer away from the substrate; the reflective layer includes the plurality of openings, and includes the plurality of overlapping parts disposed adjacent to the openings and corresponding to the openings; and the orthogonal projection of each of the overlapping parts on the plane of the substrate overlaps with the orthogonal projection of the part of each of the electronic devices on the plane of the substrate. The present disclosure can reduce the exposed area of the gaps between the reflective layer and the electronic devices by overlapping the orthogonal projection of each of the overlapping parts of the reflective layer on the plane of the substrate with the orthogonal projection of the part of each of the electronic devices on the plane of the substrate, improves optical taste of the driving backplate, and improves product quality of display devices applying the driving backplate.

The present disclosure has been described in detail with respect to the driving backplate, the manufacturing method thereof, and the display device according to the embodiments of the present disclosure. The principles and implementations of the present disclosure are described in detail here with specific examples. The above description of the embodiments is merely intended to help understand the method and core ideas of the present application. At the same time, a person skilled in the art may make changes in the specific embodiments and application scope according to the idea of the present application. In conclusion, the content of the present specification should not be construed as a limitation to the present disclosure.

What is claimed is:

1. A driving backplate comprising:
a substrate;
a reflective layer disposed on a side of the substrate, and comprising a plurality of openings; and
a plurality of electronic devices disposed on a side of the reflective layer away from the substrate, and disposed to correspond to the plurality of openings one-to-one;
wherein the reflective layer comprises a plurality of overlapping parts disposed adjacent to the openings and corresponding to the plurality of openings, and an orthogonal projection of each of the overlapping parts on a plane of the substrate overlaps with an orthogonal projection of a part of each of the electronic devices on the plane of the substrate; and one of the overlapping parts comprises an inclined surface, in a direction perpendicular to the substrate, a distance between the inclined surface at one end of the one of the overlapping parts close to a corresponding one of the openings and the substrate is less than a distance between the inclined surface at another end of the one of the overlapping parts away from the corresponding one of the openings and the substrate, and the one of the overlapping parts is not in contact with a corresponding one of the electronic devices.

2. The driving backplate of claim 1, further comprising a plurality of connection components disposed in the openings and corresponding to the plurality of openings, wherein a first end of each of the connection components close to the substrate is connected to the substrate, and a second end of each of the connection components close to the electronic devices is connected to each of the electronic devices; and
wherein a thickness of the connection components is greater than or equal to a thickness of the overlapping parts.

3. The driving backplate of claim 2, wherein each of the overlapping parts comprises a first side surface close to each of the openings, and a distance between the first side surface and each of the connection components is greater than 0 μm.

4. The driving backplate of claim 1, wherein each of the overlapping parts surrounds one of the openings, and the orthogonal projection of each of the overlapping parts on the plane of the substrate has a maximum width less than or equal to 100 μm.

5. The driving backplate of claim 1, wherein a thickness of each of the overlapping parts is greater than or equal to 10 μm and less than or equal to 35 μm; and/or
a thickness of each of the connection components is greater than or equal to 35 μm and less than or equal to 50 μm.

6. The driving backplate of claim 1, wherein a material of the reflective layer comprises titanium dioxide, and a mass percentage of the titanium dioxide in the materials of the reflective layer is greater than or equal to 35% and less than or equal to 45% ; or,
a material of the reflective layer comprises titanium dioxide, and an average particle size of the titanium dioxide is greater than or equal to 50 nm and less than or equal to 200 nm.

7. The driving backplate of claim 1, wherein the reflective layer is made from 35% to 45% by mass of the titanium dioxide, 20% to 30% by mass of the acrylate polymer, and 20% to 30% by mass of the mono-ether-based solvent; and/or
a thickness of the reflective layer is less than or equal to 60 μm.

8. The driving backplate of claim 1, further comprising a plurality of connection components disposed in the openings and corresponding to the plurality of openings, wherein a thickness of the connection components is greater than or equal to a thickness of the overlapping parts, and each of the connection components comprises a first connection member and a second connection member, and
wherein each of the electronic devices comprises a first solder pad and a second solder pad; an end of the first connection member close to the electronic devices is connected to the first solder pad, and an end of the first connection member close to the substrate is connected to the substrate; an end of the second connection member close to the electronic devices is connected to the second solder pad, and an end of the second connection member close to the substrate is connected to the substrate.

9. The driving backplate of claim 1, wherein the electronic devices comprise one or more of micro light-emitting diodes, mini light-emitting diodes, and driving integrated circuits.

10. A manufacturing method of a driving backplate, comprising:
providing a substrate;
forming a reflective layer on a side of the substrate, wherein the reflective layer comprises a plurality of openings; and
disposing a plurality of electronic devices on a side of the reflective layer away from the substrate, wherein the plurality of electronic devices are disposed to correspond to the plurality of openings one-to-one;
wherein the reflective layer comprises a plurality of overlapping parts disposed adjacent to the openings and corresponding to the plurality of openings, and an orthogonal projection of each of the overlapping parts on a plane of the substrate overlaps with an orthogonal projection of a part of each of the electronic devices on the substrate; and one of the overlapping parts comprises an inclined surface, in a direction perpendicular to the substrate, a distance between the inclined surface at one end of the one of the overlapping parts close to a corresponding one of the openings and the substrate is less than a distance between the inclined surface at another end of the one of the overlapping parts away from the corresponding one of the openings and the substrate, and the one of the overlapping parts is not in contact with a corresponding one of the electronic devices.

11. A display device, comprising a driving backplate, wherein the driving backplate comprises:
a substrate;

a reflective layer disposed on a side of the substrate, and comprising a plurality of openings; and a plurality of electronic devices disposed on a side of the reflective layer away from the substrate, and disposed to correspond to the plurality of openings;

wherein the reflective layer comprises a plurality of overlapping parts disposed adjacent to the openings and corresponding to the plurality of openings, and an orthogonal projection of each of the overlapping parts on a plane of the substrate overlaps with an orthogonal projection of a part of each of the electronic devices on the plane of the substrate; and one of the overlapping parts comprises an inclined surface, in a direction perpendicular to the substrate, a distance between the inclined surface at one end of the one of the overlapping parts close to a corresponding one of the openings and the substrate is less than a distance between the inclined surface at another end of the one of the overlapping parts away from the corresponding one of the openings and the substrate, and the one of the overlapping parts is not in contact with a corresponding one of the electronic devices.

12. The display device of claim 11, further comprising a plurality of connection components disposed in the openings and corresponding to the plurality of openings, wherein a first end of each of the connection components close to the substrate is connected to the substrate, and a second end of each of the connection components close to the electronic devices is connected to each of the electronic devices; and wherein a thickness of the connection components is greater than or equal to a thickness of the overlapping parts.

13. The display device of claim 12, wherein each of the overlapping parts comprises a first side surface close to each of the openings, and a distance between the first side surface and each of the connection components is greater than 0 μm.

14. The display device of claim 11, wherein each of the overlapping parts surrounds one of the openings, and the orthogonal projection of each of the overlapping parts on the plane of the substrate has a maximum width less than or equal to 100 μm.

15. The display device of claim 11, wherein a thickness of each of the overlapping parts is greater than or equal to 10 μm and less than or equal to 35 μm; and/or a thickness of each of the connection components is greater than or equal to 35 μm and less than or equal to 50 μm.

16. The display device of claim 11, wherein a material of the reflective layer comprises titanium dioxide, and a mass percentage of the titanium dioxide in the materials of the reflective layer is greater than or equal to 35% and less than or equal to 45%; or, a material of the reflective layer comprises titanium dioxide, and an average particle size of the titanium dioxide is greater than or equal to 50 nm and less than or equal to 200 nm.

17. The display device of claim 11, wherein the reflective layer is made from 35% to 45% by mass of the titanium dioxide, 20% to 30% by mass of the acrylate polymer, and 20% to 30% by mass of the mono-ether-based solvent; and/or a thickness of the reflective layer is less than or equal to 60 μm.

18. The display device of claim 11, further comprising a plurality of connection components disposed in the openings and corresponding to the plurality of openings, wherein a thickness of the connection components is greater than or equal to a thickness of the overlapping parts, and each of the connection components comprises a first connection member and a second connection member, and wherein each of the electronic devices comprises a first solder pad and a second solder pad; an end of the first connection member close to the electronic devices is connected to the first solder pad, and an end of the first connection member close to the substrate is connected to the substrate; an end of the second connection member close to the electronic devices is connected to the second solder pad, and an end of the second connection member close to the substrate is connected to the substrate.

19. The driving backplate of claim 1, wherein the one of the overlapping parts further comprises an inner surface directly connected to the inclined surface, the inner surface is a surface of the one of the overlapping parts closest to the corresponding one of the openings, and the inner surface is perpendicular to the substrate.

20. The driving backplate of claim 19, wherein the inclined surface is a continuous surface, one side of the inclined surface is adjacent and connected to a part of the reflective layer parallel to the substrate, and another side of the inclined surface is adjacent and connected to the inner surface.

* * * * *